Figure 1:
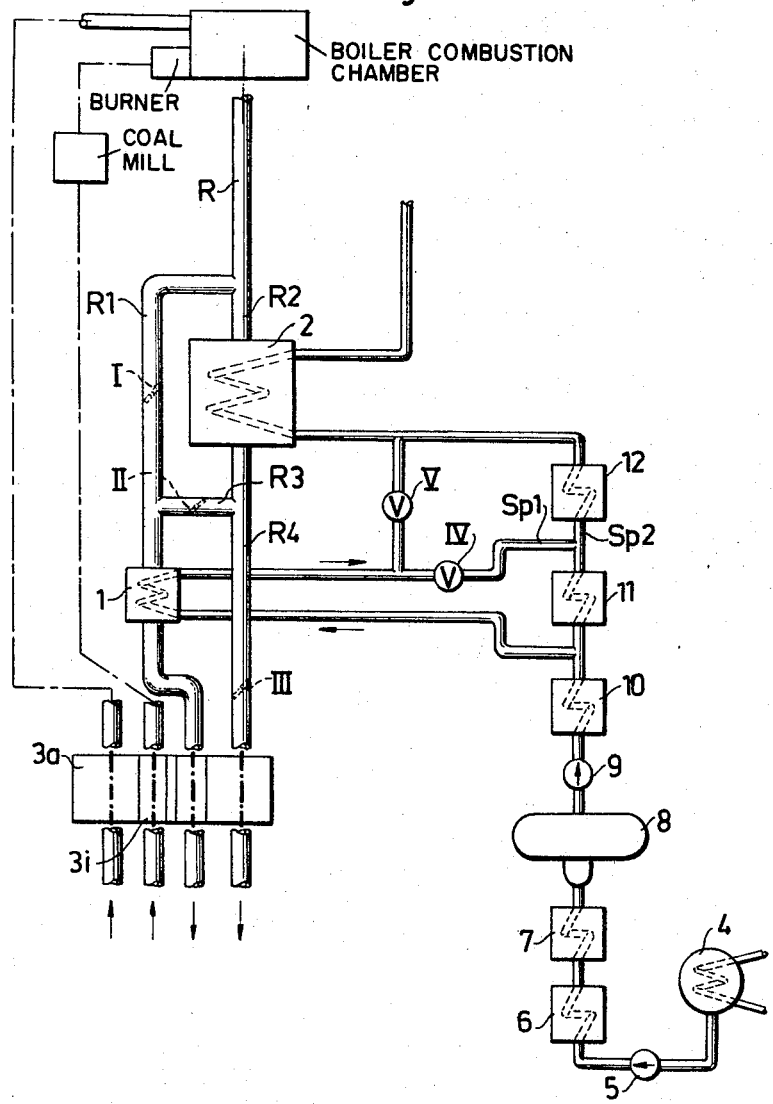

United States Patent Office 3,327,689
Patented June 27, 1967

3,327,689
BOILER PLANT INCLUDING A REGENERATIVE HEAT EXCHANGER
Wilfried Mittmann, Schwetzingen, Germany, assignor to Svenska Rotor Maskiner Aktiebolag, Nacka, Sweden, a corporation of Sweden
Filed Apr. 27, 1965, Ser. No. 451,259
Claims priority, application Germany, Apr. 30, 1964, K 52,830
4 Claims. (Cl. 122—1)

The present invention relates to boiler plants including a regenerative heat exchanger using flue gases for heating combustion air as well as air to be used as drying air in a coal mill. The object of the invention is to provide means for controlling the mill air temperature in dependence on the quality of the coal without impairing the over-all efficiency of the boiler plant.

It is known fact that it is necessary to take into consideration the quality of the coal used when determining the temperature of the air supplied to the coal mills. The humidity of the fuel is of particular importance for the selection of the right temperature. The mill air which serves to dry the fuel passes through the coal mills and is then supplied to the boiler together with the coal powder. If the temperature is too high there is a risk of ignition of the coal powder in the boiler. It is therefore necessary to very carefully see to it that the temperature of the mill air after the completion of the drying process does not exceed a maximum allowable temperature limit. On the other hand it is naturally also necessary to keep the temperature above a minimum limit in order to obtain a satisfactory drying effect.

There are already numerous proposals for adaptation of the mill air temperature to the humidity of the fuel used. In case of a single stage rotary regenerative heat exchanger which serves not only to preheat the mill air (first air) or a portion thereof but also to preheat the combustion air (second air) it is necessary to use by-passed cold air in order to bring about a required reduction of the mill air temperature. This results in a reduction of the quantity of cold air entering the air preheater.

A two stage regenerative air preheater affords the advantage that mill air may be withdrawn from the intermediate stage or downstream of the hot stage of the air preheater as desired. By mixing these two partial quantities it is possible to give the mill air any desired temperature which lies between the temperature of the intermediate stage and that at the outlet of the hot stage. However, also in this case it is necessary to use by-passed cold air if the temperature shall be adjusted on a value lying below the temperature in the intermediate stage.

A further improvement is obtained by means of a combined air preheater in which the regenerator body is subdivided into an inner and an outer section by a cylindrical partition. In such an embodiment the combustion air (second air) is heated in the outer section of the regenerator body and the mill air (first air) in the coaxial inner section. In this way the by-passing of cold mill air can be dispensed with. The total quantity of mill air is conveyed through the inner section of the regenerator body. In order to reduce its temperature it is sufficient to correspondingly reduce the partial flue gas quantity passing in counter-current through this section of the regenerator body.

However, all embodiments described above are impaired by the draw-back that a reduction of the mill air temperature results in an increase of the flue gas temperature which means an impairment of the efficiency of the boiler plant. Due to this fact the invention has for its object to obviate this draw-back and to make it possible to control the mill air temperature without impairing the efficiency of the boiler plant.

Thus, the invention relates to boiler plants including a regenerative heat exchanger using flue gases as heating medium for preheating combustion air as well as mill air. The essential feature by which the boiler plant according to the invention differs over against known plants of this type resides in that there is provided in the mill channel system in series with the regenerative heat exchanger a recuperative heat exchanger which is passed by a controllable partial feed water flow. In this way it is possible to effect the temperature of the mill air by controlling the flow of feed water through the recuperator, viz to reduce the temperature of the mill air in required extent by withdrawal of heat. The small partial quantity of feed water required for this purpose is drawn off from the feed water preheater downstream of one of its intermediate regenerative preheater stages at a point at which the temperature of the feed water still is sufficiently low to render heat absorption possible.

There are essentially two different possibilities to affect the mill air and each of these possibilities will be explained with refrence to an illustrative example. In the two boiler plants shown the regenerative air preheater is of the type in which the regenerator body is made such that there is a special portion for the preheating of the mill air. In the drawing FIG. 1 illustrates a boiler plant in which the recuperative heat exchanger is inserted in the flue gas channel leading to the mill portion of the regenerative heat exchanger while FIG. 2 illustrates the other embodiment in which the recuperative heat exchanger is provided in the mill air channel leading from the regenerative heat exchanger.

Figure 2:
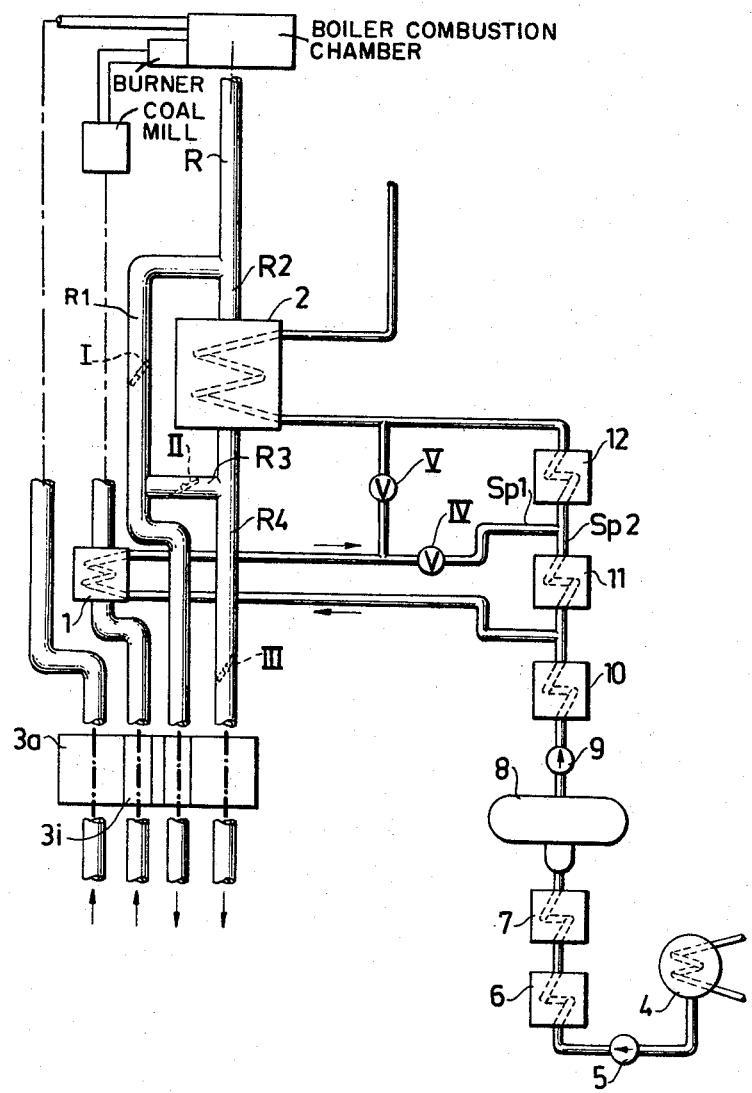

In the boiler plant shown in FIG. 1 the additional recuperative heat exchanger 1 is provided in the flue gas flow between the feed water heater section 2 which is located in the boiler and heated by the hot flue gases and normally comprises a plurality of stages, and the inner regenerator body portion 3$i$ of the regenerative heat exchanger. Thus, this portion 3$i$ is in known manner intended solely for the preheating of the mill air. The coaxial outer portion 3$a$ of the regenerator body serves to heat the combustion air. This last mentioned portion does not need any explanation.

Referring to the embodiment shown, upstream of the feed water heater section 2 located in the boiler and heated by the flue gases the total quantity R of hot flue gases discharged from the furnace is divided into a main flow R2 passing said section 2 and a branch flow R1 for the heating of the mill air. Downstream of the feed water heater section 2 a further partial flow R3 is branched from the main flue gas flow R2 and this flow R3 joins the partial flow R1 while the remaining main portion R4 of the flue gas flow is supplied to the outer regenerator body portion 3$a$ of the regenerative air preheater for the heating of the combustion air.

The flue gas flow $R1+R3$ intended for the mill portion is then conveyed through the recuperator 1 in which heat can be withdraw from it by the feed water partial flow in a desired accurately controllable manner so that exceeding of the dangerous maximum temperature is definitely avoided. After having left the condenser 4 the feed water is conveyed by a pump 5 through the preheaters 6 and 7 in which it is in known manner preheated regeneratively by means of bled steam and it is then supplied to the feed water tank 8. The feed water is then drawn from the tank 8 by means of a pump 9 and conveyed through the succeeding heat exchangers 10, 11 and 12 in which the further heating is brought about likewise regeneratively by means of bled steam. Finally the feed water further passes the above-mentioned last section of the feed water preheater. This section is located in the boiler and is subjected directly to the hot flue gases coming from the furnace. In this section 2 which normally likewise comprises several stages the final heating of the feed water up to the required temperature takes place.

The feed water partial flow required for the recuperator 1 is withdrawn downstream of the preheater stage 10. After having passed the recuperator which is also passed by the flue gas flow $R1+R3$ to be cooled, the feed water partial flow $Sp1$ is conveyed back downstream of the preheater stage 11 into the flow leaving that stage and joins this last mentioned flow to form the full feed water flow $Sp2$. However, if the returning partial flow $Sp1$ at the heating in the recuperator has attained the same temperature as the feed water downstream of the stage 12, that is before the entrance into the final stage 2, the partial flow $Sp1$ can also be led back downstream of said stage 12 by means of the direct conduit shown in the drawing and containing a valve V. Under all circumstances the tapping of the partial flow must take place at a point where the temperature of the feed water is still sufficiently low to render it possible for the feed water to absorb a sufficiently large quantity of heat in the recuperator 1.

For the attainment of the most favourable conditions there are provided different control elements. Thus, the flue gas flow R1 can be controlled by means of a damper I, the flue gas flow R3 by means of a damper II and the flue gas flow R4 by means of a damper III. In order to increase the temperature of the mill air the damper II is moved to a strongly throttling position or to fully closed position while the damper I is opened so that the effect of the high temperature flue gas flow R1 is correspondingly increased. In order to reduce the temperature of the mill air the damper I is moved to a strongly throttling position or to fully closed position and the damper II is opened.

In the feed water circuit the control is brought about by means of the valves IV and V. If these two valves are throttled the heat absorption will be reduced. For a reduction of the mill air temperature the procedure will be reversed.

It is evident that the plant illustrated offers several possibilities to set the required mill air temperatures at the flue gas side as well as, preferrably, at the feed water side by means of the recuperator 1. With this adjustment of the mill air temperature one can attain ratio between the heat capacities of the air and the flue gases in the mill portion of the regenerative heat exchanger which is approximately the same as the ratio between the heat capacities in the main portion which serves to heat the combustion air.

In the plant according to FIG. 2 the elements are the same as in that according to FIG. 1 and they are therefore marked with the same reference numerals and letters. The difference resides in that in the plant according to FIG. 2 the recuperator 1 lying in series with the regenerator heat exchanger is provided in the mill air channel at the air side and not at the flue gas side. Disregarding this fact the division of the main flow R into the partial flows R1 and R2 and further the subdivision of the last mentioned flow downstream of the stage 2 into the two flows R3 and R4 and the control by means of the dampers I, II and III at the flue gas side is exactly the same. Therefore, at the flue gas side there are exactly the same control possibilities. The flow paths at the feed water side are also the same. The difference resides substantially in that according to FIG. 1 the recuperator 1 influences the flue gas partial flow which serves to heat the inner portion $3i$ of the regenerator body and in this way indirectly effect the mill air while according to FIG. 2 the recuperator 1 is provided at the air side and absorbs heat directly from the mill air flow.

It is evident that a division of the regenerator body of the regenerative heat exchanger into separate portions for the first air and the second air is not necessary if the recuperator 1 is provided at the air side in accordance with FIG. 2. Thus, it is not necessary to use a regenerative air preheater which according to the embodiments shown are coaxially divided or in likewise known manner comprises two or more successive heating stages the separating zones of which are suited for withdrawal of air of mean temperature. On the contrary it is possible to use regenerative heat exchangers the regenerator bodies of which form undivided units. The conduit leading to the coal mills can be branched from the air channel leading from the hot end of the regenerative heat exchanger at any desired point, immediately downstream of the heat exchanger or later, and the recuperator 1 is inserted in this mill air conduit.

Starting from the explanations of FIG. 1 there is nothing of importance to add as regards the operation of the embodiment according to FIG. 2 because for the rest the conditions are the same.

A common feature of all plants according to the invention consists in that the additional recuperator 1 permits reduction of the mill air temperature without any increase of the flue gas exit temperature which would involve a more incomplete exploitation of the heat of the flue gases and a correspondingly lower efficiency of the plant. It is therefore always possible to maintain the most favourable flue gas temperature independently of the actual temperature of the mill air.

Naturally the application of the invention does not preclude the possibility to additionally also use bypass channels for influencing the mill air temperature. However, as stated above, as this would mean a decrease of the over-all efficiency this possibility is resorted to to a small extent only.

What is claimed is:

1. In boiler plant apparatus of the character described having a regenerative heat exchanger in flow communication with both said boiler plant and a coal mill for heating both the combustion air and the coal mill air for said plant and said mill with the flue gases from said boiler plant and for controlling the temperature of the air for said coal mill substantially without increasing the temperature of flue gases leaving therefrom, and a source of water to be heated by said boiler, the combination which comprises channel means providing flow communication of said flue gas from said boiler to said regenerative heat exchanger and flow communication between said regenerative heat exchanger and said coal mill and the combustion chamber of said boiler, a feed water heater disposed in said boiler plant and in flow communication with said source of water, an auxiliary heat exchanger disposed in said channel means between said boiler and said coal mill and in flow communication between said feed water heater and said source of water for withdrawing a portion of water therefrom for flow through said auxiliary heat exchanger and for recirculation back to said boiler plant, and control means disposed between said source of water and said auxiliary heat exchanger for controlling the amount of water flowing therethrough for reducing the temperature of the heated air flowing to said coal mill substantially without increasing the temperature of the flue gases leaving said regenerative heat exchanger.

2. Apparatus as described in claim 1 in which said regenerative heat exchanger is divided into a combustion air heating portion and a coal mill air heating portion with said channel means comprising separate channels providing separate flow of flue gases from said boiler to said separate portions and separate flow of heated air from said separate portions, and in which said auxiliary heat exchanger is disposed in said flue gas channel between said boiler and said coal mill air heating portion.

3. Apparatus as described in claim 1 in which said regenerative heat exchanger is divided into a combustion air heating portion and a coal mill air heating portion with said channel means comprising separate channels providing separate flow of flue gases from said boiler to said separate portions and separate flow of heated air from said separate portions, and in which said auxiliary heat exchanger is disposed in said coal mill air channel between said coal mill air heating portion and said coal mill.

4. Apparatus as described in claim 1 in which said regenerative heat exchanger is divided into a combustion air heating portion and a coal mill air heating portion with said channel means comprising separate channels providing separate flow of flue gases from said boiler to said separate portions and separate flow of heated air from said separate portions, with said feed water heater disposed in said flue gas channel between said boiler and said combustion air heating portion, and with said flue gas channel between said boiler and said coal mill air heating portion flowing around said feed water heater, a branch channel providing flow communication between said flue gas channels at a point between said feed water heater and said regenerative heat exchanger, and control means disposed in said flue gas channels and said branch channel for directing selectively the flow of flue gases therethrough.

References Cited
UNITED STATES PATENTS

| | | | |
|---|---|---|---|
| 1,753,363 | 4/1930 | Coghlan et al. | 122—1 |
| 2,795,213 | 6/1957 | Cooper | 122—1 |

CHARLES J. MYHRE, *Primary Examiner.*